United States Patent [19]
Lee et al.

[11] Patent Number: 5,675,706
[45] Date of Patent: Oct. 7, 1997

[54] VOCABULARY INDEPENDENT DISCRIMINATIVE UTTERANCE VERIFICATION FOR NON-KEYWORD REJECTION IN SUBWORD BASED SPEECH RECOGNITION

[75] Inventors: Chin-Hui Lee, New Providence, N.J.; Rafid Antoon Sukkar, Aurora, Ill.

[73] Assignee: Lucent Technologies Inc., Murray Hill, N.J.

[21] Appl. No.: 414,243

[22] Filed: Mar. 31, 1995

[51] Int. Cl.$^6$ .................................................. G10L 5/04
[52] U.S. Cl. .............................. 395/2.65; 395/2.63
[58] Field of Search .................... 395/2.6, 2.63–2.66; 398/2.61

[56] References Cited

U.S. PATENT DOCUMENTS

| | | | |
|---|---|---|---|
| 5,329,608 | 7/1994 | Bocchieri et al. | 395/2.63 |
| 5,390,278 | 2/1995 | Gupta et al. | 395/2.63 |
| 5,440,662 | 8/1995 | Sukkar | 395/2.45 |

*Primary Examiner*—Fan Tsang
*Attorney, Agent, or Firm*—Michael B. Johannesen

[57] ABSTRACT

A verification system to determine unknown input speech contains a recognized keyword or consists of speech or other sounds that do not contain any of the keywords. The verification system is designed to operate on the subword level, so that the verification process is advantageously vocabulary independent. Such a vocabulary-independent verifier is achieved by a two-stage verification process comprising subword level verification followed by string level verification. The subword level verification stage verifies each subword segment in the input speech as determined by an Hidden Markov Model recognizer to determine if that segment consists of the sound corresponding to the subword that the HMM recognizer assigned to that segment. The string level verification stage combines the results of the subword level verification to make the rejection decision for the whole keyword. Advantageously, the training of this two-stage verifier is independent of the specific vocabulary set implying that when the vocabulary set is update or changed the verifier need not be retrained and can still be reliably verifying the new set of keywords.

14 Claims, 5 Drawing Sheets

VOCABULARY INDEPENDENT DISCRIMINATIVE UTTERANCE VERIFICATION FOR NON-KEYWORD REJECTION IN SUBWORD BASED SPEECH RECOGNITION

TECHNICAL FIELD

This invention relates to the field of automated speech recognition, and, more specifically, to a system and method for vocabulary independent utterance verification for non-keyword rejection in subword-based speech recognition.

BACKGROUND OF THE INVENTION

Recent advances in speech recognition technology have enabled speech recognition systems to migrate from the laboratory to many services and products. Examples of speech recognition applications can be found in areas ranging from telecommunications to computers and consumer products. Telecommunication applications such as automated operator services and name (or alias) dialing have been successfully deployed. Other applications such as speaker-trained dictation and hands-free computer navigation systems are now commercially available. As the technology proliferates to reach an increasing number of users, speech recognition systems need to be robust to a wide range of user response and behavior. Unaware of technology limitations, users expect the system to work properly even if their response includes disfluencies (such as hesitation, false starts, and sounds like "um" and "ah"). Other extraneous sounds like lip smacks and heavy breathing are typically encountered in most applications.

Users may also respond with speech that does not include any of the recognizer keywords, or with speech that includes a keyword embedded in a phrase or a sentence. A response such as "I'd like to make a collect call please" is not uncommon in the context of automated operator services, where the keyword "collect" is embedded in a sentence. In the same automated operator context, a variety of responses can be anticipated that do not include any of the keywords. An example is "Can I talk to a real person?" To deal with such responses and disfluencies, the recognizer must: a) be able to spot a keyword embedded in other speech or sounds ("wordspotting") and b) reject speech that does not include any of the valid keywords. However, wordspotting and rejection of non-keywords are interrelated; good wordspotting capability necessarily implies good rejection performance. The ability to perform rejection implies that the speech recognition system has the capability to test the recognized word provided by the speech recognizer, and verifies whether the input speech signal does indeed contain the recognized word (i.e., the most probable word identified by the recognizer) or, alternatively, other speech. This is the origin of the term "utterance verification."

Keyword spotting and rejection are two areas that have attracted many research efforts. Most of these efforts focused on wordspotting in the context of detecting certain keywords in conversational and continuous speech. Filler models are generally employed here to act as a sink for out-of-vocabulary speech events and background sounds.

Other rejection and wordspotting efforts have centered on menu driven applications that are especially useful in telecommunications and computer applications. Typical menu applications are isolated digit recognition for automating call routing and isolated keyword recognition for automating operator services. R. A. Sukkar and J. G. Wilpon, "A two pass classifier for utterance rejection in keyword spotting," Proc. 1993 IEEE Int. Conf. on Acoust., Speech and Signal Processing, pp. 451–454, Vol. 2, April 1993, defined a rejection discriminator that is trained specifically to discriminate between keywords and non-keywords. B. Chigier, "Rejection and keyword spotting algorithms for a directory assistance city name recognition application," Proc. 1992 IEEE Int. Conf. on Acoust., Speech and Signal Processing, pp. 93–96, Vol. 2, March 1992, used a set of features including the likelihood of a sink (or filler) model to form a classifier for rejecting both non-keywords and recognition errors. L. Villarrubia and A. Acero, "Rejection Techniques for digit recognition in telecommunication applications," Proc. 1993 IEEE Int. Conf. on Acoust., Speech and Signal Processing, pp. 455–458, Vol. 2, April 1993, used an affine transformation of the likelihood of a filler model to perform non-keyword rejection. M.-W. Feng and B. Mazor, "Continuous word spotting for applications in telecommunications," Proc. 1992 Int. Conf. on Spoken Language Processing, pp. 21–24, Vol 1, 1992, trained a set of non-keyword HMM models and used them in parallel with the keyword models. In this scheme, the reject/accept decision was made by computing a rejection score that is a combination of the likelihood scores of the keyword and non-keyword models.

An important class of speech recognition technology is subword based recognition. One main advantage of subword based modeling over whole-word modeling approaches cited above is that it offers the capability of recognizing words not seen in the training data. When using subword models for recognition, words are usually modeled by concatenating subword models according to their lexical representations. Therefore, the vocabulary set needed for an application can be quickly constructed by compiling the corresponding lexical representation, alleviating the need for collecting application specific speech data. When subword models are trained using data that is not application specific, the training process is often referred to as vocabulary (or task) independent modeling. Vocabulary independent modeling is necessary if the recognizer is expected to be deployed in different applications and scenarios.

By extension, it is highly desirable that any rejection and wordspotting capabilities must also be vocabulary independent. Strategies for vocabulary independent non-keyword (or background speech) rejection must therefore make no prior assumptions about the target keywords and expected non-keywords. For example, R. C. Rose and E. M. Hofstetter, "Task independent wordspotting using decision tree based allophone clustering," Proc. 1993 IEEE Int. Conf. on Acoust., Speech and Signal Processing, pp. 467–470, Vol. 2, April 1993, uses decision tree allophone clustering to model both in-vocabulary and out-of-vocabulary subword units. D. A. James and S. J. Young, "A fast lattice-based approach to vocabulary independent wordspotting," Proc. 1994 IEEE Int. Conf. on Acoust., Speech and Signal Processing, pp. 377–380, Vol. 1, April 1994, approaches vocabulary independent wordspotting by designing a lattice based algorithm that operates on phonetic strings generated by a generic Hidden Markov Model (HMM) subword recognizer. The keyword set information is contained only in the lattice based algorithm which can be quickly updated to add a new keyword. However, none of these systems provide a robust vocabulary independent rejection mechanism while still providing the economics of subword-based recognition.

Therefore, a problem in the art is that there is no reliable means for determining whether an utterance is, in fact, a recognized keyword in subword-based recognition system, where no prior assumptions can realistically be made regarding the keywords and expected non-key words that are encountered in a given application. These assumptions cannot be made because the subword speech recognizer is expected to operate in different scenarios and applications, wherein the keywords and non-keywords models cannot be made in advance, resulting in a vocabulary dependent utterance verification.

SUMMARY OF THE INVENTION

This problem is solved and a technical advance is achieved in the art by a system and method that verifies the recognized probable keyword determined by a subword-based recognizer. Verification determines, with a high degree of certainty, whether the unknown input speech does indeed contain the recognized keyword or consists of speech or other sounds that do not contain any of the predetermined recognizer keywords. The verification system of this invention is designed to operate on the subword level, so that the verification process is advantageously vocabulary independent.

Such a vocabulary-independent verifier is achieved by a two-stage verification process comprising subword level verification followed by string level verification. The subword level verification stage verifies each subword segment in the input speech as determined by a Hidden Markov Model (HMM) recognizer to determine if that segment does indeed consist of the sound corresponding to the subword that the HMM recognizer assigned to that segment. Since keywords are composed of individual subwords, the string level verification stage combines the results of the subword level verification to make the rejection decision for the whole keyword. Advantageously, the training of this two-stage verifier is independent of the specific vocabulary set; which implies that, when the vocabulary set is updated or changed, the verifier need not be retrained and can still reliably verify the new set of keywords.

According to this invention, a subword-based Hidden Markov Model (HMM) recognizer is used to produce a hypothesis as to what keyword in the recognizer keyword set was spoken. In addition to producing a probable keyword, it segments the input utterance into a string of subwords that correspond to the lexical representation of the probable keyword. The HMM recognizer also generates likelihood scores for each subword segment. The subword level verification stage takes the information produced by the HMM recognizer and generates a subword verification likelihood ratio score for each subword in the probable keyword. Such verification scores are generated by using the subword segmentation and likelihood information produced by the HMM recognizer and information produced by passing each separate segment through an anti-subword HMM model that is specifically constructed for this verification task. Three sets of parameters are generated for each of the subword and anti-subword model: 1. the HMM state centroids of the recognition observation vector for the given subword segment; 2. the HMM state duration computed as the number of frames spent in each HMM state divided by the total number of frames for that segment; and 3. the HMM likelihood score for each segment. These parameters define a feature vector which is then incorporated into a linear discriminator whose weights are trained using generalized probablistic descent (GPD) discriminative training framework.

These subword verification scores are used as input to a string level verification stage, which, according to this invention, makes the acceptance or rejection decision for the probable keyword. This keyword verification decision is made by combining the subword verification scores to produce a single parameter that can be compared to a threshold in order to make the final keyword rejection decision. According to an exemplary embodiment, the combining of the subword verification scores is accomplished by generating (i.e., modeling) two probability density functions for each subword representing the verification scores when the subword was correctly recognized and when the subword was incorrectly recognized. These probability density functions are then used to produce a logarithmic likelihood difference for each subword in the probable keyword which are added to produce a keyword verification score. The keyword verification score is compared to a threshold to make the final verification or rejection decision of the probable keyword.

BRIEF DESCRIPTION OF THE DRAWING

A more complete understanding of the invention may be obtained from a consideration of the following description in conjunction with the drawings, in which.

DETAILED DESCRIPTION

Figure 1:
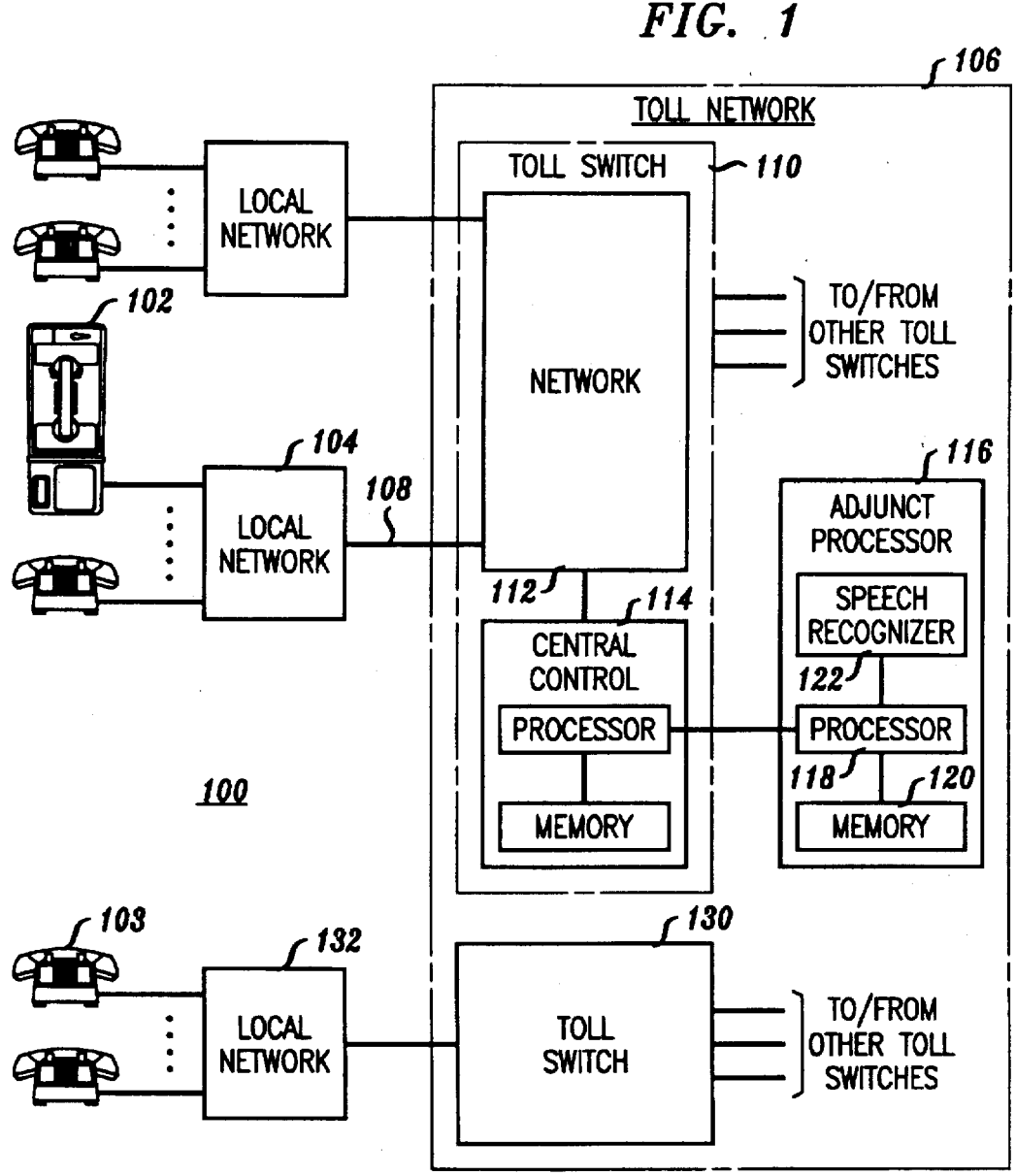
FIG. 1 is a block diagram of a telephone network illustrating a toll switch equipped with an adjunct processor, wherein an exemplary embodiment of this invention may be practiced.

FIG. 1 is a block diagram of a telephone network 100 suitable for practicing an exemplary embodiment of this invention. A customer at a calling telephone, for example, pay phone 102, wishes to reach a telephone 103 (called telephone). The customer at pay phone 102 wishes to use a credit card to pay for the call. The customer dials the telephone number of called telephone 103; the number is analyzed by a local switch in local network 104 and determined to indicate a long distance or network call. Local network 104 sends the call into a toll network 106 by seizing an access trunk or channel 108, as is known in the art, to toll switch 110. The call is received in switching network 112 at toll switch 110.

As part of call setup, toll switch 110 records billing information. In this exemplary embodiment, a pay phone does not have billing information associated with it; therefore, central control 114 of toll switch 110 connects adjunct processor 116 to the call. Adjunct processor 116 collects credit card billing information from phones, such as pay phone 102 to which it is connected. For purposes of describing this invention, adjunct processor 116 uses an exemplary embodiment of this invention which collects credit card information verbally. However, this invention is not limited to this embodiment as this invention may be used to determine any verbal utterance in any application.

Adjunct processor 116 comprises a plurality of service circuits such as speech recognizer 122, processor 118, and memory 120. Processor 118 connects the call through to speech recognizer 122. Speech recognizer 122 first prompts the customer at pay phone 102 in order to determine how the customer wants to pay for the call. Expected responses include "credit card," "collect," "third party," etc. To this end, speech recognizer 122 processes the verbal responses received from the customer at pay phone 102, by first processing the spoken word (utterances) through an HMM recognizer to determine a probable keyword, one or more subword segments of the probable, and one or more likelihood scores for the subword segments. Next, speech recognizer 122 decides whether to accept or reject the probable keyword according to this invention. Speech recognizer 122 develops a plurality of subword and anti-subword scores for the one or more subword segments, (anti-subwords are defined further, below, in connection with Table 5). Next, the system develops a confidence score by combining the plurality of subword and antisubword scores and then determines whether the probable keyword has been detected by comparing the confidence scores to a predetermined threshold. If the confidence score is greater than or equal to the threshold, then the probable keyword is used and appropriate action is taken, as necessary. For example, toll switch 110 then connects to a second toll switch 130 which completes the call to local network 132 and to called telephone 103.

Figure 2:
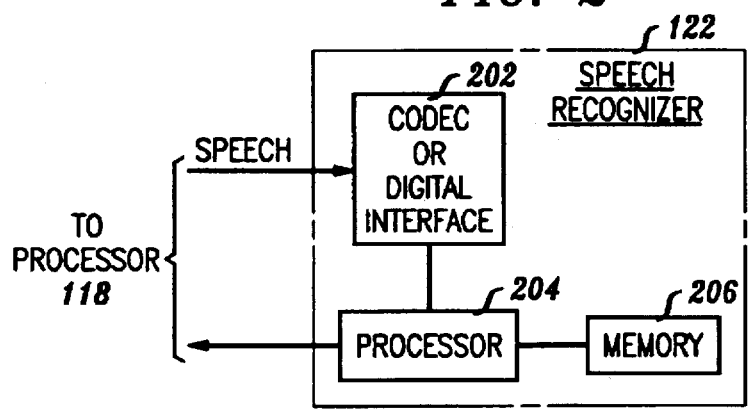
FIG. 2 is a more detailed block diagram of a speech recognizer of FIG. 1, wherein an exemplary embodiment of this invention may be practiced.

Turning now to FIG. 2, a speech processing unit 122 in which an exemplary embodiment of this invention may operate is shown. Incoming speech is delivered by processor 118 of adjunct processor 116 (FIG. 1) to CODEC or digital interface 202. CODEC 202, as is known in the art, is used in situations where the incoming speech is analog, and a digital interface is used in cases where incoming speech is in digital form. Once the incoming speech has been digitized, it is delivered to processor 204, which performs analysis of the speech. Memory 206, connected to processor 204, is used to store the digitized speech being processed and to store a program according to the exemplary embodiment of this invention. Processor 204 is responsive to the instructions of the program in memory 206 to process incoming speech and make a determination of a keyword and whether or not the recognized keyword is good enough to be treated as valid.

Figure 3:
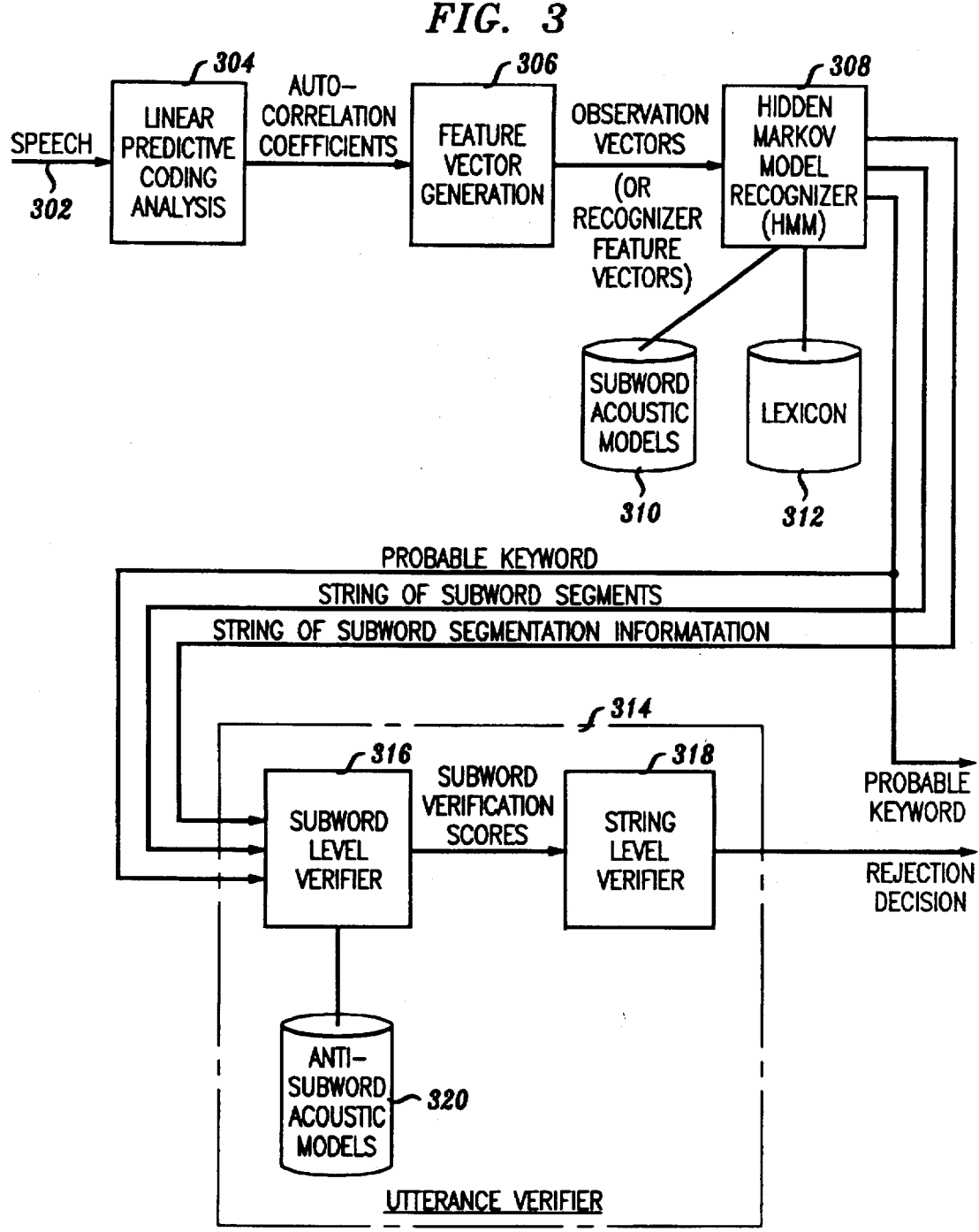
FIG. 3 is a functional block diagram of the processing performed in the speech recognizer of FIG. 2 according to an exemplary embodiment of this invention.

Turning now to FIG. 3, a block diagram of the basic functionality of the exemplary embodiment of this invention as it operates in the processor 204 of speech recognizer 122 of FIG. 2 is shown. Digitized speech sampled at 8 KHz is blocked into frames and is used as input 302 to a linear predictive coding analysis system 304. Linear predictive coding analysis 304 takes the digitized speech and produces auto-correlation coefficients which are used as an input to a feature vector generation system 306. Linear predictive coding analysis 304 and feature vector generation 306 represent each frame with 38 parameters. For purposes of describing the exemplary embodiment of this invention, a 10th order linear predictive coding analysis system is used having a 30 ms overlapping window length and 10 ms update rate. A total of 38 parameters are computed, consisting of the first 12 cepstral coefficients, their first derivatives (called the delta cepstral coefficients), the second derivatives (called delta-delta cepstral coefficients), delta energy, and delta-delta energy. Linear predictive coding analysis delivers the first ten auto-correlation coefficients to feature vector generator 306. Feature vector generator 306 produces the 38 parameter subset on a frame-by-frame basis.

The feature vectors are then used as an input to a Hidden Markov Model recognizer (HMM 308), as is known in the art, which then attempts to recognize one of a plurality of keywords. HMM recognizer 308 uses a plurality of acoustic models 310 and a lexicon 312 in order to perform its recognition task. Lexicon 312 is advantageously replaceable, because HMM recognizer 308 uses a plurality of subword acoustic models from database 310 (as shown in Table 3 below). The output of HMM recognizer 308 is a probable keyword, a string of subword segments of the probable keyword, and a string of subword segmentation information.

TABLE 3

| \multicolumn{6}{c}{Subword Model Set} | | | | | |
|---|---|---|---|---|---|
| Subword | Example | Subword | Example | Subword | Example |
| h# | silence | en | button | ow | boat |
| aa | father | er | bird | oy | boy |
| ae | bat | ey | bait | p | pop |
| ah | but | f | fief | r | red |
| ao | bought | g | gag | s | sister |
| aw | now | hh | hay | sh | shoe |
| ax | again | ih | bit | t | tot |
| axr | dinner | ix | debit | th | thief |
| ay | bite | iy | beat | uh | book |
| b | bob | jh | judge | uw | boot |
| ch | church | k | kick | v | very |
| d | dad | l | led | w | wet |
| dh | they | m | mom | y | yet |
| dx | butter | n | nun | z | zoo |
| eh | bet | ng | sing | zh | measure |
| el | bottle | nx | center | | |

The subword model set used in the recognition consists of 47 context independent units shown in Table 3. Each subword is modeled by a three state left-to-right continuous density HMM. One exception is the silence/background model which uses only one state. A mixture of Gaussians with diagonal covariances is employed to estimate the density function for each state. A maximum of 16 mixtures per state is allowed. The states' density functions are estimated using maximum likelihood training over the training set of a sentence database. The lexical representations of the sentences are obtained by processing the sentence orthographic transcriptions through a text-to-speech front end. Viterbi decoding is employed in the recognition process to determine the most likely keyword, $W_k$, where $$W_k = \text{argmax}_j L(O|W_j) \tag{2}$$

and $L(O|W_j)$ is the likelihood of the observation sequence, O, given keyword $W_j$. In the context of subword recognition, $W_k$ is a concatenation of subword units which can be written as $$W_k = s_1^{(k)} s_2^{(k)} \ldots s_N^{(k)} \tag{3}$$

where the subword string $s_1^{(k)} s_2^{(k)} \ldots s_N^{(k)}$ is the subword lexical representation of keyword $W_k$, and N is the number of subword units comprising $W_k$. Assuming independence among subwords, maximum likelihood Viterbi decoding implies that we can write the likelihood $L(O|W_k)$ as $$L(O|W_k) = \max_{t_1, t_2, \ldots, t_{N-1}} L(O_{t_0}^{t_1}|s_1^{(k)}) L(O_{t_1}^{t_2}|s_2^{(k)}) \ldots L(O_{t_{N-1}}^{t_N}|s_N^{(k)}). \quad (4)$$

where $O_{t_{i-1}}^{t_i}$ is the observation sequence between time $t_{i-1}$ and $t_i$, corresponding to subword unit $s_i^{(k)}$.

This invention then takes the output of the HMM recognizer and verifies the recognized keyword. Utterance verifier 314 determines whether the unknown input speech does indeed contain the recognized keyword or consists of speech (or other sounds) that do not contain any of the keywords. Utterance verifier 314 is designed to operate on the subword level, so that the verification process is advantageously vocabulary independent.

Such a vocabulary-independent utterance verifier 314 is achieved by a two-stage verification process comprising subword level verification 316 followed by string level verification 318. The subword level verification stage verifies each subword segment in the input speech (as sent by HMM recognizer 308 as input) to determine if that segment does indeed consist of the sound corresponding to the subword that HMM recognizer 308 assigned to that segment. This stage uses anti-subword acoustic models 320 to model the set of sounds not assigned to the probable keyword subword segments. Subword level verifier 316 then generates a set of feature vectors for both the set of subwords and anti-subwords.

Since keywords are composed of individual subwords, string level verifier 318 stage combines the results of the subword level verification to make the rejection/acceptance decision for the probable keyword. Advantageously, the training of this two-stage verifier is independent of the specific vocabulary set, so that when the recognized keyword vocabulary set is updated or changed, the verifier need not be retrained and can still be reliably verifying the new set of keywords.

Figure 4:
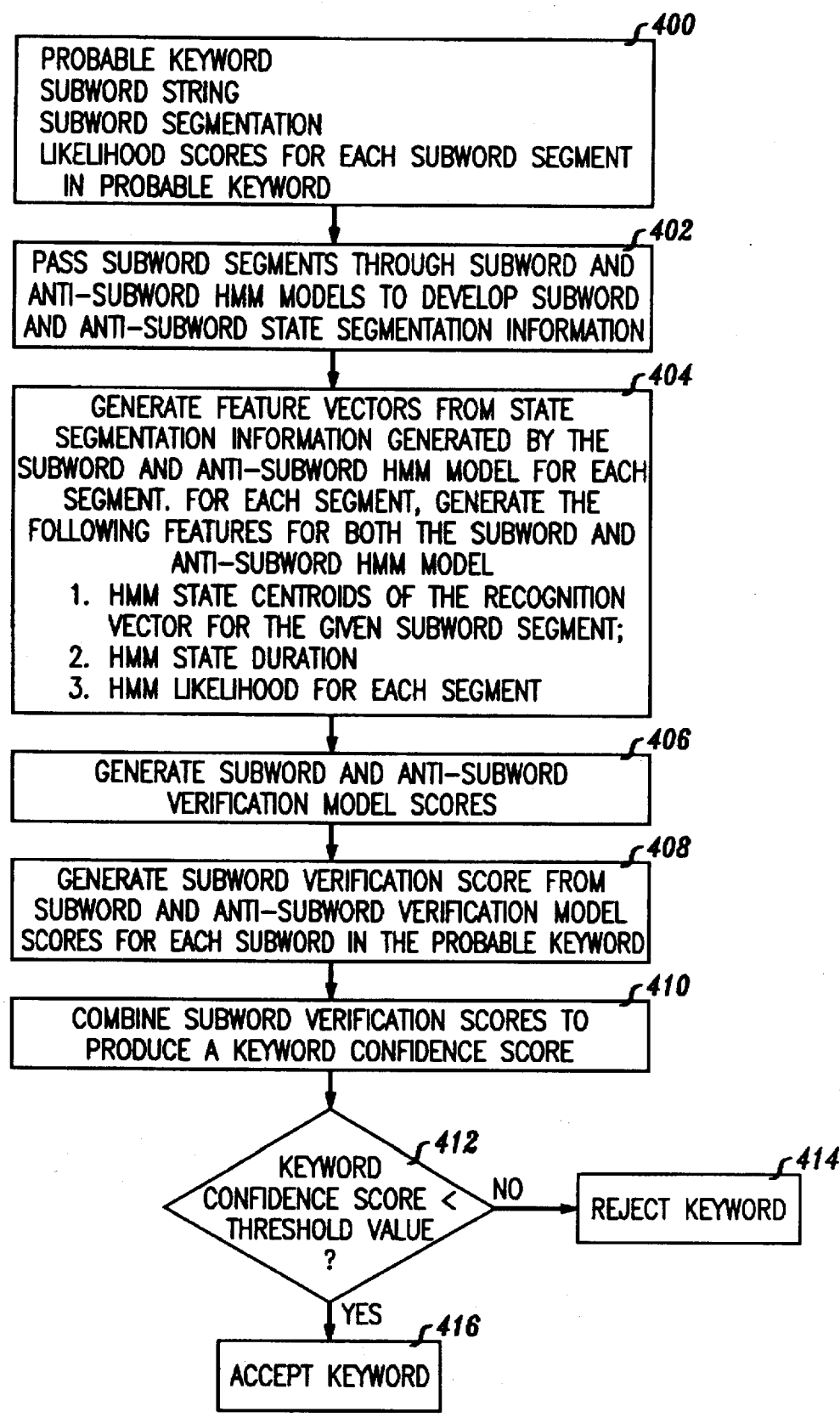
FIG. 4 is a flow chart describing the processing steps according to an exemplary embodiment of this invention, as performed in the speech recognizer of FIG. 2 according to the functionality of FIG. 3.

Turning now to FIG. 4, a flow chart describing processing, as illustrated in the block diagram of FIG. 3 (being performed by the processor of FIG. 2) is shown. According to this invention, box 400 shows that a subword Hidden Markov Model (HMM) recognizer produces a hypothesis as to what probable keyword (from the recognizer keyword set) was spoken as a probable keyword. In addition to producing the probable keyword, it segments the input utterance into a string of one or more subwords that correspond to the lexical representation of the probable keyword. The HMM recognizer generates likelihood scores for each of the one or more subword segments in the probable keyword.

In box 402, the subword verification stage uses the subword segmentation and likelihood information produced by the HMM recognizer and information produced by passing each separate subword segment through an anti-subword HMM model specifically constructed for this verification task. The segmentation information of both the subword and anti-subword models are used to generate a feature vector (in action box 404) for each of the subword and anti-subword models. For each segment, the HMM state centroids, the HMM state duration and the HMM likelihood scores are generated.

In action box 406, subword and anti-subword verification model scores are generated. Next, in action box 408, subword verification scores are generated by incorporating the subword and anti-subword feature vectors generated in action box 404 into a linear discrimination whose weights are trained using generalized probabilistic descent training.

In box 410, these subword verification scores are used as input to a string level verification stage, which according to this invention, makes the verification or rejection decision for the probable keyword. This keyword verification decision is made by combining the subword and anti-subword segment verification scores to produce a single parameter that can be compared to a threshold. According to an exemplary embodiment, the combining of the subword verification scores is accomplished by producing two probability density functions representing the verification scores when the subword was correctly recognized and when the subword was incorrectly recognized for each subword, which are then used to produce a logarithmic likelihood difference for each subword. The likelihood differences for all subwords in the recognized keyword are then added to produce a keyword verification (or confidence) score.

In decision diamond 412, the keyword confidence score is compared to a threshold value. If he score is less than the threshold, the probable keyword is rejected in box 414. If, in decision diamond 412, the score is greater than or equal to the threshold, then in box 416, the probable keyword is deemed to be recognized and is accepted. These operations may be seen in the following mathematical model of this invention.

Utterance verification can be formulated as the problem of statistical hypothesis testing. The null hypothesis, $H_0$, represented by the input speech containing a given keyword, $W_k$, is tested against the alternative hypothesis, $H_1$, represented by the input speech not containing $W_k$. According to Neyman-Pearson Lemma (K. Fukunaga, "Introduction to Statistical Pattern Recognition," Academic Press, 1972), an optimal hypothesis test involves the evaluation of the likelihood ratio written as, $$T(O;W_k) = \frac{L(O|H_0)}{L(O|H_1)} \quad (1)$$

where O is the observation sequence, $L(O|H_0)$ is the likelihood of the observation sequence given the keyword hypothesis, and $L(O|H_1)$ is the likelihood of the observation sequence given the non-keyword hypothesis. The hypothesis test is performed by comparing the likelihood ratio, $T(O; W_k)$, to a predefined critical threshold, $r_k$. The region $T(O; W_k) \geq r_k$ is called the acceptance region, and the region $T(O; W_k) < r_k$ is called the critical rejection region. As a result, two types of errors can occur: false rejection (Type I) errors, and false acceptance or false alarms (Type II) errors. A given critical threshold value implies certain false rejection and false alarm rates. Tradeoff between the two types of errors can be controlled by varying $r_k$.

If the probability density functions corresponding to $L(O|H_0)$ and $L(O|H_1)$ are known exactly, then the generalization of the Neyman-Pearson theory shows that the likelihood ratio test is the "most powerful test" (i.e., results in the least Type II error rate for a given Type I error rate). However, in the context of utterance verification, these density functions are usually not known. Nevertheless, the likelihood ratio test can still be applied by making appropriate approximations to $L(O|H_0)$ and $L(O|H_1)$, as will be discussed below.

A sentence database consisting of 5730 phonetically balanced sentences spoken by 958 speakers was collected over the public telephone network in a U.S.-wide data collection covering the different dialectical regions. A digital telephone interface was used in the collection system. The data is divided into two sets: a training set consisting of 2874 sentences used to train subword HMM and verification models, and a testing set consisting of 2856 sentences used to evaluate the "goodness" of the subword models.

As stated above, utterance verification is defined as performing a hypothesis test to answer the question: Does the input speech contain the keyword corresponding to the most probable keyword as determined by the speech recognizer? Posing the problem in this fashion, utterance verification consists of a post-recognition process that tests the keyword hypothesis produced by the recognizer. Given the above-stated goal of vocabulary independence, utterance verification performed in the context of subword based recognition is formulated according to this invention as a set of independent hypothesis tests. Based on the lexical representation of the most likely keyword model, each hypothesis test represents a subword level verification test. A string level verification stage combines the results of the subword level verification tests to make the final keyword accept/reject decision.

This two-step process is depicted in FIG. 3 (utterance verifier 314), where the term "lexicon" refers to the lexical representation of all the words in the recognizer vocabulary set. Vocabulary independence is accomplished by requiring that no retraining of either stage of the utterance verifier is necessary when the lexicon is changed or updated.

Subword level verification 316 (FIG. 3) consists of the following: given the subword string, $s_1^{(k)} s_2^{(k)} \ldots s_N^{(k)}$, corresponding to the most likely keyword, $W_k$, subword level verification is performed independently on each subword in the string. This implies a series of N independent tests which can be formulated as N independent likelihood ratio tests. For a given subword, $s_j^{(k)}$ in $W_k$, the likelihood ratio is $$T(O_{t_{j-1}}^{t_j}; s_j^{(k)}) = \frac{L(O_{t_{j-1}}^{t_j}|H_0)}{L(O_{t_{j-1}}^{t_j}|H_1)}, 1 \leq j \leq N, \quad (5)$$

where $O_{t_{j-1}}^{t_j}$ is the observation sequence corresponding to the HMM segmentation for subword $s_j^{(k)}$, $H_0$ is the hypothesis that the segment $O_{t_{j-1}}^{t_j}$ consists of the actual sound for subword $s_j^{(k)}$, and $H_1$ is the hypothesis that the segment $O_{t_{j-1}}^{t_j}$ consists of a different sound. To simplify the notation and without loss of generality, the superscript (k) is dropped from $s_j^{(k)}$ and $O_{t_{j-1}}^{t_j}$ is represented as $O_j$. Using this simplified notation and taking the log of equation (5) results in a log likelihood difference, written as $$G(O_j; s_j) = \log[L(O_j|H_0)] - \log[L(O_j|H_1)], 1 \leq j \leq N. \quad (6)$$

Since the exact nature of the density functions corresponding to $L(O_j|H_0)$ and $L(O_j|H_1)$ are not known, an approximation to the likelihood difference is needed. One way of viewing the likelihood difference of equation (6) is as a measure of the classification of two classes. The first class represents the case of correct subword recognition where the segment $O_j$ does indeed consist of the sound corresponding to $s_j$. The second class is the complement of the first class and represents the case of incorrect subword recognition where the segment $O_j$ does not consist of the sound corresponding to $s_j$. Given such a classification problem a reasonable subword verification function that can approximate the log likelihood difference is $$V_j^{(1)}(O_j; s_j) = \quad (7)$$

$$\log[L(O_j|s_j)] - \log\left[ \frac{1}{K-1} \sum_{\substack{k=1 \\ k \neq j}}^{K} \exp(\gamma \log[L(O_j|s_k)]) \right]^{1/\gamma},$$

where $L(O_j|s_j)$ is the HMM likelihood score for the observation sequence $O_j$ given subword model $s_j$, K is the total number of subword models, and $\gamma$ is a constant. Comparing equations (6) and (7), it can be seen that the likelihood in the first term of equation (7) models $L(O_j|H_0)$, while the second term's geometric mean models $L(O_j|H_1)$. This geometric mean may be viewed as a measure of the likelihood of an "anti-subword" model to $s_j$. If $O_j$ consists of the sound corresponding to $s_j$, then $V_j^{(1)}(O_j; s_j)$ will, in general, be positive. On the other hand, if $O_j$ consists of a sound other than that represented by $s_j$, then the anti-subword likelihood will dominate and $V_j^{(1)}(O_j; s_j)$ will in general be negative. If $\gamma$ is set very large, the sum in the second term of equation (7) is dominated by the largest likelihood value. This implies that only the contribution of the first competing subword model to $s_j$ is considered. As $\gamma$ is made smaller, the contribution of the other likelihoods become more significant. In practice, $\gamma$ is set to a value that results in an overall good verification performance for all subwords.

The verification function, $V_j^{(1)}(O_j; s_j)$, as it is defined in equation (7), requires the evaluation of the likelihood of the speech segment, $O_j$, given each of the subword models in the model set. Since the segment $O_j$ is determined at the backtracking step of the HMM recognition process, the evaluation of $L(O_j|s_k)$ for all k must be performed post-recognition. Moreover, these likelihood computations must be performed for each subword segment in $W_k$. This can be computationally overwhelming, implying that a significant delay is necessary before the verification decision can be made.

To reduce the computational complexity, according to this invention, the likelihood of the anti-subword model is considered as the geometric likelihood mean over a smaller number of competing subword models. In particular, a competing set consisting of a number of subwords less than K is defined for each subword. The competing set (or "cohort set") for a given $s_j$ is defined to be a fixed number of subwords that are most confusable with $s_j$. The cohort set for each subword is determined based on the confusion matrix of the HMM subwords over the training set of database DB1.

TABLE 4

| Examples of Subword Cohort Sets. | | | | | |
|---|---|---|---|---|---|
| Subword | Cohort Set | | | | |
| ae | eh | ay | aw | ey | ih |
| aw | ae | ah | ao | ow | aa |
| ao | aa | ow | aw | w | ah |
| m | n | ng | l | w | uw |
| ch | jh | sh | t | s | k |
| s | z | f | sh | th | h# |
| sh | s | ch | z | jh | zh |

Table 4 includes examples of cohort sets for seven different subwords, where only the first 5 cohorts are shown. The function of the subword cohorts defined for subword verification is similar to the function of speaker specific cohorts used in speaker verification. In speaker verification, the cohort set likelihood scores are used to form a likelihood ratio type test. Similarly, the cohort set likelihoods are used in subword verification to define a subword verification function. By considering only a fixed number of cohorts for a given subword, the verification function can now be written as $$V_j^{(2)}(O_j; s_j) = \quad (8)$$

$$\log[L(O_j|s_j)] - \log\left[ \frac{1}{M} \sum_{m=1}^{M} \exp(\gamma \log[L(O_j|s_{c_j(m)})]) \right]^{1/\gamma},$$

where M is the number of subwords in the cohort set, and $c_j(m)$, $1 \leq m \leq M$ are the subword indexes of the cohort set for subword $s_j$. The verification performance of $V_j^{(1)}(O_j; s_j)$ and $V_j^{(2)}(O_j; s_j)$, are compared using Receiver Operator Characteristics (ROC) plots.

Figure 5:
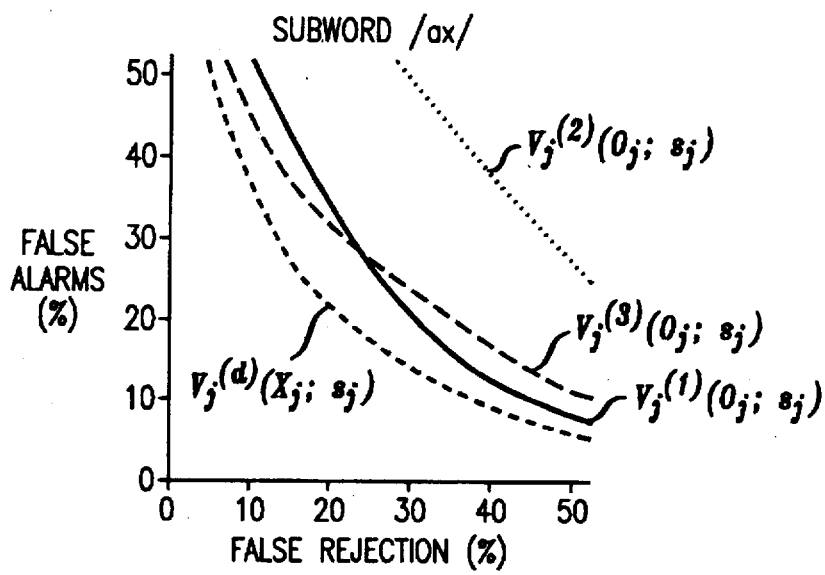
FIGS. 5–7 are graphical representations of anti-subword models of speech segments developed according to the exemplary embodiment of this invention.
Figure 6:
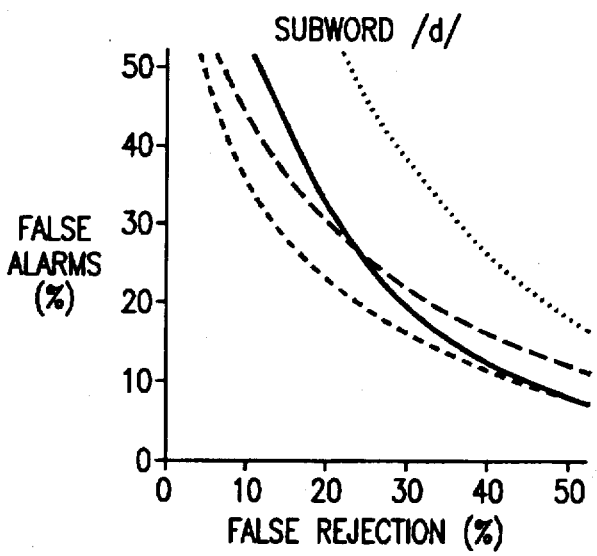
Figure 7:
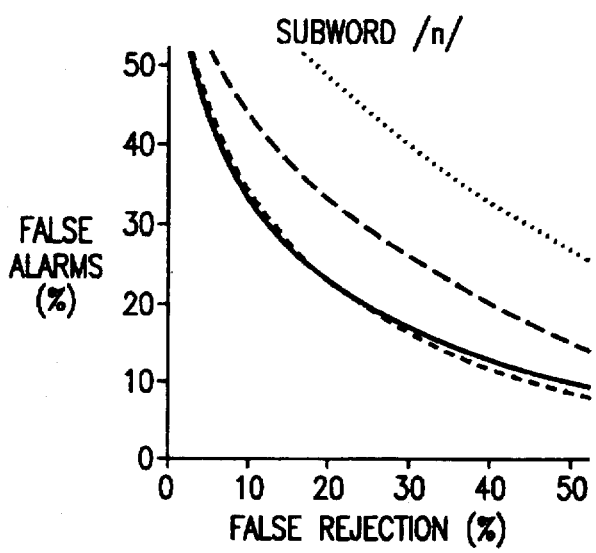

FIGS. 5–7 show ROC plots for three different subwords: a vowel (FIG. 5), a consonant (FIG. 6), and a nasal (FIG. 7). These results were generated by setting $\gamma=0.5$ for both $V_j^{(1)}(O_j; s_j)$ and $V_j^{(2)}(O_j; s_j)$ and setting the number of cohorts, M in $V_j^{(2)}(O_j; s_j)$ to 5. The false rejection rate in these plots represents correctly recognized subwords that are rejected (Type I error), and the false alarm rate represents incorrectly recognized subwords that are accepted (Type II error). These error rates were computed in two passes. First, the verification scores for the case of correct subword recognition were computed by processing each sentence in testing set of the sentence database through the recognizer and force-segmenting it with the correct sentence lexicon. Second, the incorrect subword recognition scores were computed by processings the same test sentences through the recognizer and force-segmenting it with a random lexicon to simulate incorrect recognitions. It is clear from these figures that $V_j^{(1)}(O_j; s_j)$ significantly outperforms the less computationally intensive $V_j^{(2)}(O_j; s_j)$. This loss in performance is mainly due to the fact that a small number of cohorts is too limited to adequately model all of the sounds that are confusable with a given subword. Given these results, the goal now becomes to develop a verification function that is both low in computational complexity and achieves a verification performance that is equal to or better than that of $V_j^{(1)}(O_j; s_j)$.

The formulation of the subword level verification problem as a classification problem lends itself to a discriminative training approach. It has been shown in the art that discriminative training, when applied to HMM modeling for speech recognition and speaker verification, improves performance significantly. For purposes of this patent application, a discriminative training framework is defined that is specifically tailored to the subword level verification task. A subword verification function is defined to form a linear discriminator whose weights are discriminatively trained. For a given subword, $s_j$, the subword verification function is written as $$V_j^{(d)}(X_j; s_j) = a_{s_j}^T x_{s_j} - a_{\bar{s}_j}^T x_{\bar{s}_j} \qquad (9)$$

where $X_j = [x_{s_j}^T x_{\bar{s}_j}^T]$ represents the discriminator feature vector, and the vectors $a_{s_j}$ and $a_{\bar{s}_j}$ are the discriminator weights. The terms $a_{s_j}^T x_{s_j}$ and $a_{\bar{s}_j}^T x_{\bar{s}_j}$ can be viewed as measures of the log likelihoods of the subword and anti-subword models, respectively. $a_{s_j}^T x_{s_j}$ is called the subword verification model score, and $a_{\bar{s}_j}^T x_{\bar{s}_j}$ is the anti-subword verification model score. $V_j^{(d)}(X_j; s_j)$ is the subword verification score. Similar to $V_j^{(1)}(O_j; s_j)$ and $V_j^{(2)}(O_j; s_j)$, $V_j^{(d)}(X_j; s_j)$ verifies if the HMM segmented sequence $O_j$ consists of the sound corresponding to subword $s_j$. While $V_j^{(1)}(O_j; s_j)$ and $V_j^{(2)}(O_j; s_j)$ rely on the HMM likelihood scores to perform the verification, the $V_j^{(d)}(X_j; s_j)$ feature vector consists of other discriminative parameters such as spectral and duration features in addition to HMM likelihood scores. As the feature vector of a two class discriminator, $X_j$ incorporates features corresponding to both classes: correct and incorrect subword recognition. The features corresponding to the correct recognition class are represented by the subvector $x_{s_j}$, while the features corresponding to the incorrect recognition class are represented by $x_{\bar{s}_j}$.

As is typically in any discrimination or pattern recognition problem dealing with time sequences, it is desirable to time-normalize the signal so that it can be represented by a fixed length feature vector. Time normalization is accomplished according to this invention by using the HMM state segmentation information by normalizing the speech segment to be verified, $O_j$, into a fixed number of states. Specifically, the features in $x_{s_j}$ and $x_{\bar{s}_j}$ are computed based on the state segmentation of $O_j$ by two HMM models: $s_j$, and a competing "anti-subword" model, $\bar{s}_j$. For every subword model in the model set, a corresponding anti-subword model is trained specifically for the verification task. As a competing model to $s_j$, the corresponding anti-subword HMM model, $\bar{s}_j$, would have to model a wide range of sounds, rendering it very general and ineffective.

According to this invention the concept of "anti-subword class" HMM models is used. The anti-subword class models are constructed by, first, clustering the subword units into J classes, where J<<K. A hierarchical clustering algorithm is used to cluster subwords based on minimizing the overall inter-subword cluster confusion rate. Subwords that are highly confusable with other subwords are likely to be clustered together. Given the subword model set, $\{s_i\}$, the subword confusion information is obtained from the subword confusion matrix of the training set of sample sentences. Setting J=6, the constituency of each class is given in Table 5, which shows, for example, that certain vowel sounds are clustered into one class (Class B) while nasals are included under Class E. For each subword class, an anti-subword class model is trained using all speech segments corresponding to sounds that are not modeled by any of the subwords in that subword class. Based on the classes shown in Table 5, a total of 6 anti-subword class models are constructed. The anti-subword model, $\bar{s}_j$, is now considered to be the anti-subword class model corresponding to the class to which $s_j$ belongs.

TABLE 5

Subword Classes.

| Class | Subwords | | | | | | | | | | | | |
|---|---|---|---|---|---|---|---|---|---|---|---|---|---|
| A | b | p | dh | v | ch | jh | sh | t | d | en | zh | nx | dx f th |
| B | aa | ao | ay | ah | aw | el | ow | l | oy | uh | w | ax | uw |
| C | ae | eh | ih | ix | ey | iy | hh | y | | | | | |
| D | axr | er | r | | | | | | | | | | |
| E | m | n | ng | | | | | | | | | | |
| F | g | k | | | | | | | | | | | |

The parameters of the feature vectors, $x_{s_j}$ and $x_{\bar{s}_j}$, are obtained by processing the speech segment, $O_j$, through $s_j$ and $\bar{s}_j$, respectively. Specifically, $x_{s_j}$ forms a 118 dimensional vector consisting of:

1. State centroids of the recognizer feature vectors of $O_j$ segmented by $s_j$. Given 3-state models and 38 dimensional recognition feature vector, the number of parameters computed here is 114;

2. Three parameters representing the $s_j$ state durations in number of frames normalized by the total frame duration of $O_j$;

3. The HMM likelihood, $L(O_j|s_j)$.

Similarly, $x_{\bar{s}_j}$ is formed by segmenting $O_j$ using the anti-subword model $\bar{s}_j$ and computing the corresponding 118 parameters. The above definition of the discriminator feature vector is similar to the discrimination vector used in R. A. Sukkar and J. G. Wilpon, "A two pass classifier for utterance rejection in keyword spotting," Proc. 1993 IEEE Int. Conf. on Acoust., Speech and Signal Processing, pp. 451–454, Vol. 2, April 1993, for rejection in the context of whole word speech recognition. Although duration features were not used in the above-cited reference, it was shown that the state based spectral features form good discrimination parameters in separating keywords from non-keywords.

It can be seen from equation (9) that the computational complexity of $V_j^{(d)}(X_j; s_j)$ is considerably less than that of $V_j^{(1)}(O_j; s_j)$ or $V_j^{(2)}(O_j; s_j)$. Given that the state segmentation of $O_j$ is available as a byproduct of the recognition process, the computation of $V_j^{(d)}(X_j; s_j)$ involves a) processing $O_j$ through the anti-subword model, $\bar{s}_j$ and b) performing a 236 element dot product. This is to be compared with $V_j^{(1)}(O_j; s_j)$ which requires the processing of $O_j$ by all subword models, $s_k$, $1 \leq k \leq K$, for which $k \neq j$. A similar comparison can be made with $V_j^{(2)}(O_j; s_j)$. The additional memory storage that is required for VIDUV consists of storing the six anti-subword class HMMs and the discriminator weight vectors, $a_{s_j}$ and $a_{\bar{s}_j}$ for each of the six classes.

The weights of $V_j^{(d)}(X_j; s_j)$ are trained using generalized probabilistic descent (GPD) discriminative training framework. In its original formulation, GPD discriminative training was developed to minimize recognition errors by optimizing with respect to the HMM model parameters. According to this invention, the GPD training framework is used to minimize the subword level verification error count associated with $V_j^{(d)}(X_j; s_j)$. The goal is to determine the discriminator weight vectors, $a_{s_j}$ and $a_{\bar{s}_j}$, such that the $V_j^{(d)}(X_j; s_j)$ is large when the sequence $O_j$ consists of the sound corresponding to $s_j$ and small otherwise. Consistent with the GPD framework, a loss function is defined and minimized with respect to the discriminator weights. The loss function represents a smooth functional form of the verification error count. It takes the form of a sigmoid function which is written as $$R_j(A_j, X_j) = \frac{1}{1 + \exp[-\lambda b V_j^{(d)}(X_j; s_j)]}, \quad 1 \leq j \leq K, \quad (10)$$

where $$A_j = [a_{s_j}^T a_{\bar{s}_j}^T], \quad (11)$$

$$b = \begin{cases} -1 & \text{if } O_j \in s_j \\ +1 & \text{if } O_j \notin s_j \end{cases} \quad (12)$$

and $\gamma$ is a constant which controls the steepness of the sigmoid function.

Minimizing the expected value $E[R_j(A_j, X_j)]$ with respect to $A_j$ is the ideal goal. However, since the probability density function of $X_j$ is not known, a gradient-based iterative procedure is used to minimize $R_j(A_j, X_j)$ as follows, $$(A_j)_{n+1} = (A_j)_n - \epsilon \nabla R_j((A_j)_n, (X_j)_n), \quad (13)$$

where $\nabla R_j((A_j)_n, (X_j)_n)$ is the gradient of the loss function with respect to $A_j$ evaluated at the $n^{th}$ training sample which is represented by $(X_j)_n$, and $\epsilon$ is the update step size. Exemplars of both correct and incorrect subword recognition of the sequence $O_j$ are presented to the iterative process of equation (13). The correct subword recognition class (i.e., $O_j \in s_j$ for $1 \leq j \leq K$) is considered to be all subword segments obtained by the HMM segmentation of the sentences in training set of sample sentences using the correct lexical representation of the sentences. As a way to simulate incorrect subword recognitions, the incorrect subword recognition class (i.e., $O_j \notin s_j$ for $1 \leq j \leq K$) is considered to be all subword segments obtained by the HMM segmentation of the sentences in training set of sample sentences using the random lexical representations.

Figure 8:
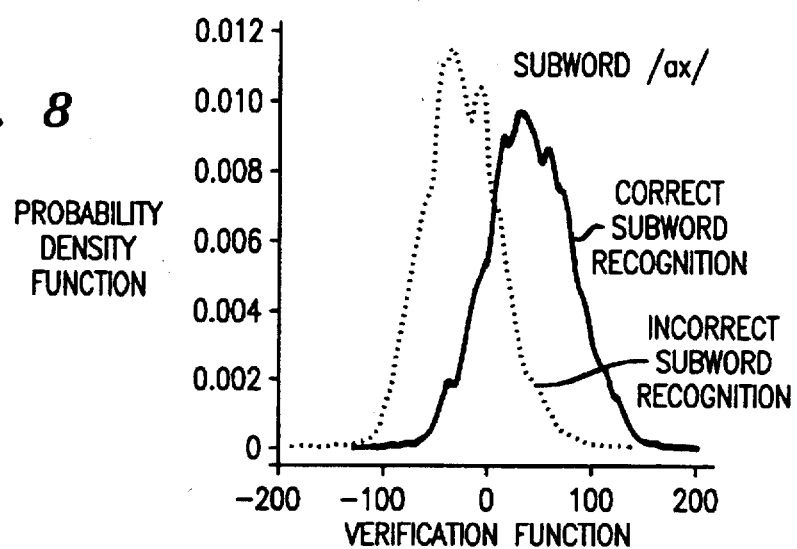
FIGS. 8–10 are acceptance graphs developed according to an exemplary embodiment of this invention.
Figure 9:
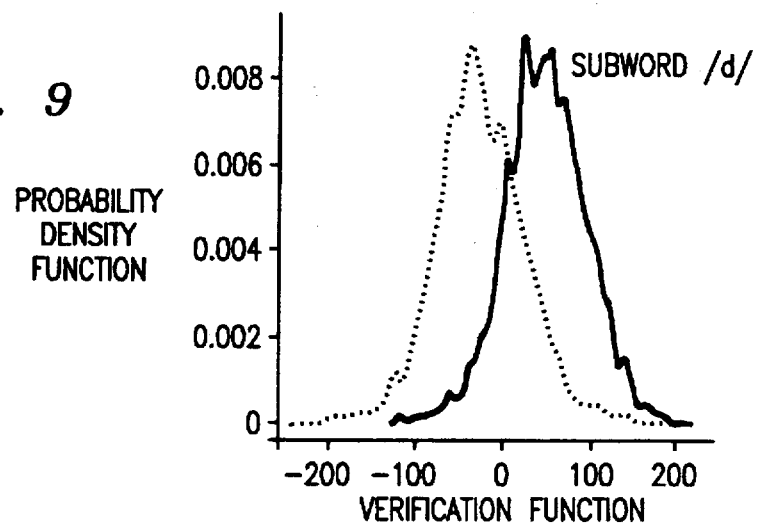
Figure 10:
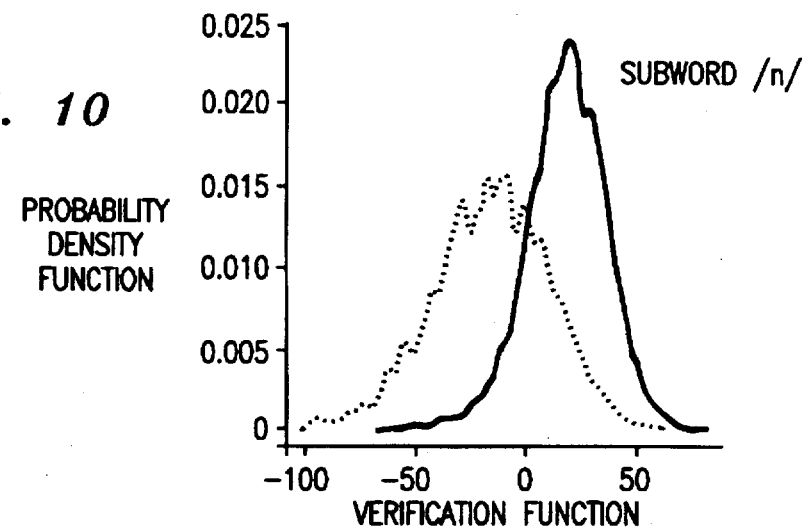

FIGS. 8–10 show examples of the probability distribution of $V_j^{(d)}(X_j; s_j)$ for the same 3 subwords of FIGS. 5–7, respectively. Two distributions are plotted for each subword: one for the case of correct subword recognition and another for the case of incorrect subword recognition. These results can also be displayed as ROC curves. FIGS. 8–10 show a comparison of the verification performance of $V_j^{(d)}(X_j; s_j)$ with the performance of $V_j^{(1)}(O_j; s_j)$ and $V_j^{(2)}(O_j; s_j)$. It can be seen from these figures that despite its low computational complexity, $V_j^{(d)}(X_j; s_j)$ outperforms the other two functions. To gain more insight into the performance of $V_j^{(d)}(X_j; s_j)$, a fourth verification function, $V_j^{(3)}(O_j; s_j)$, is plotted in FIGS. 8–10. This function uses only the likelihood score feature of the discrimination vector $X_j$. In particular $V_j^{(3)}(O_j; s_j)$ forms a log likelihood difference defined as $$V_j^{(3)}(O_j; s_j) = \log[L(O_j|s_j)] - \log[L(O_j|\bar{s}_j)]. \quad (14)$$

Comparing the verification performances of $V_j^{(d)}(X_j; s_j)$ with $V_j^{(3)}(O_j; s_j)$ gives an indication of the contribution of the spectral and duration parameters of $X_j$ in reducing the verification error rate. As can be seen from these figures, the discriminative power of the verification function is significantly enhanced by the inclusion of spectral and duration parameters in addition to HMM likelihood scores.

The string level verification stage makes the final rejection/acceptance decision of the keyword hypothesis made by the HMM recognizer. Equation (1) shows the formulation of keyword verification as a likelihood ratio test. In the context of subword based recognition, the keyword likelihood ratio test can be decomposed into a series of subword level likelihood ratios. Assuming independence among subwords, the string level likelihood ratio for keyword $W_k$ can be written as a product of subword level likelihood ratios as follows, $$T(O; W_k) = \prod_{j=1}^{N} T(O_j; s_j) \quad (15)$$

where N is the total number of subword in the lexical representation of $W_k$ and $T(O_j; s_j)$ is the subword verification likelihood ratio score. Taking the log of equation (15) and using equation (6) gives the string (keyword) log likelihood difference $$G(O; W_k) = \sum_{j=1}^{N} [\log[L(O_j|H_0)] - \log[L(O_j|H_1)]]. \quad (16)$$

When $V_j^{(d)}(X_j; s_j)$ is used as the subword level verification function, the likelihood functions in equation (16) are modeled by the probability density functions of $V_j^{(d)}(X_j; s_j)$. To parameterize the probability density functions of $V_j^{(d)}(X_j; s_j)$, a Normal distribution is used. The choice of Normal parametric representation is motivated by the fact that $V_j^{(d)}(X_j; s_j)$ consists of a sum of terms, each of which can be thought of as a random variable. Invoking the central limit theorem, we can conclude that the distribution of $V_j^{(d)}(X_j; s_j)$ should be close to Normal. This is verified by the examples given in FIGS. 8–10. The mean and variance of each verification function corresponding to a given subword are estimated from the training set of sample sentences. Therefore, the log likelihood difference can be reformulated as a function of the $V_j^{(d)}(X_j; s_j)$ distributions as $$G(O; W_k) = \sum_{j=1}^{N} [\log[f(V_j^{(d)}(X_j; s_j)|O_j \in s_j)] - \log[f(V_j^{(d)}(X_j; s_j)|O_j \notin s_j)]]. \quad (17)$$

The string rejection/acceptance decision is made by comparing $G(O; W_k)$ the "keyword" confidence score) to a threshold. The threshold may be predefined, or may be adaptive.

It is to be understood that the above-described embodiments are merely illustrative principles of the invention, and that many variations may be devised by those skilled in the art without departing from the scope of this invention. It is, therefore, intended that such variations be included within the scope of the appended claims.

The invention claimed is:

1. A method for use in a speech recognition system to verify whether input speech signals comprising digitized speech represents a probable keyword, said probable keyword being determined by a speech recognizer, said method comprising the steps of:
   processing said digitized speech into recognizer observation vectors;
   processing said recognizer observation vectors in a Hidden Markov Model (HMM) keyword recognizer, said HMM keyword recognizer having output signals representing said probable keyword, one or more subword segments of said probable keyword, and a likelihood score for each of said one or more subword segments;
   developing a plurality of subword verification likelihood ratio scores for said one or more subword segments of said probable keyword by generating two probability density functions (PDFs) for each subword, wherein a first of said PDFs represents a PDF of subword verification scores when said subword is correctly recognized and a second of said PDFs represents a PDF of subword verification scores when said subword is not correctly recognized;
   developing a keyword verification confidence score from said plurality of subword verification likelihood ratio scores for each of said one or more subword segments;
   verifying whether said probable keyword is present in said input speech signals by comparing said keyword verification confidence score to a threshold; and
   delivering as an output said probable keyword if said threshold test is met, and delivering as an output an indication that no keyword is detected if said threshold test is not met.

2. A method in accordance with claim 1 wherein said subword verification score comprises a difference between a subword verification model score and an anti-subword verification model score.

3. A method in accordance with claim 2 wherein said subword verification model score comprises a weighted sum of the components of a subword verification model feature set.

4. A method in accordance with claim 3 wherein said weights in said subword verification score are determined by a discriminative training procedure.

5. A method in accordance with claim 2 wherein anti-subword verification model score comprises a weighted sum of components of an anti-subword verification model feature set.

6. A method in accordance with claim 5 wherein said weights in said anti-subword verification score are determined by a discriminative training procedure.

7. A method in accordance with claim 3 wherein said subword verification model feature set is computed for each of said one or more subword segments.

8. A method in accordance with claim 5 wherein said anti-subword verification model feature set is computed for each said subword segment.

9. A method in accordance with claim 7 wherein said subword verification model feature set for a given subword segment is determined by processing said subword segment through a corresponding HMM model and computing HMM state centroids of the recognizer observation vector, HMM state durations, and an HMM likelihood score.

10. A method in accordance with claim 6 wherein said anti-subword verification model feature set for a given segment is determined by processing said subword segments through an anti-subword HMM model of the recognized subword for that segment and computing HMM state centroids of the recognizer observation vector, HMM state durations, and an HMM likelihood score.

11. A method in accordance with claim 10 wherein anti-subword HMM models are generated specifically for said verification task, and, for a given subword, an anti-subword model is trained to model sounds other than those modeled by said subword HMM model.

12. A method in accordance with claim 2 wherein the weights in said subword verification score are determined by a discriminative training procedure.

13. A method in accordance with claim 1 wherein keyword verification confidence score is generated by taking the logarithm of the product of the subword verification likelihood ratio scores of all of the subwords comprising the keyword; wherein said keyword verification confidence score represents a logarithmic likelihood difference for said keyword.

14. A keyword detection apparatus that determines whether a digitized speech signal includes one of a preselected plurality of keywords, said apparatus comprising:
   means for receiving input signals representing digitized speech and developing a plurality of signals representing feature vectors of said digitized speech;
   means responsive to said input signals and said signals representing feature vectors of said digitized speech for developing output signals representing a probable keyword, one or more subword segments of said probable keyword, and one or more likelihood scores for each of said speech segments;
   means for developing a plurality of subword and anti-subword model scores for one or more subword segments of said probable keyword, wherein said means for developing a plurality of subword and anti-subword model scores includes means for generating two probability density functions for each subword, wherein a first of said probability density functions represents a probability density function of subword verification scores when said subword is correctly recognized and a second of said probability density functions represents a probability density function of subword verification scores when said subword is not correctly recognized;
   means for determining a confidence score by combining said plurality of subword and anti-subword scores of said one or more subword segments; and
   means for comparing said confidence score against a threshold value for determining whether the probable keyword is present in said input signals.

* * * * *